United States Patent [19]
Burgdorf

[11] 3,941,216
[45] Mar. 2, 1976

[54] BRAKE SHOE SUPPORT FOR A SPOT-TYPE DISC BRAKE

[75] Inventor: Jochen Burgdorf, Offenbach, Germany

[73] Assignee: ITT Industries, Inc., New York, N.Y.

[22] Filed: Mar. 18, 1975

[21] Appl. No.: 559,603

Related U.S. Application Data

[63] Continuation-in-part of Ser. No. 449,297, March 8, 1974, abandoned.

[30] Foreign Application Priority Data

Mar. 20, 1973 Germany.......................... 2313692

[52] U.S. Cl. .............. 188/72.4; 188/73.6; 188/234; 188/250 G
[51] Int. Cl.² .................. F16D 55/224; F16D 69/04
[58] Field of Search ....... 188/73.3, 73.5, 73.6, 72.4, 188/234, 250 B, 250 F, 250 G

[56] References Cited
UNITED STATES PATENTS

| | | | |
|---|---|---|---|
| 3,275,105 | 9/1966 | Petit | 188/250 B |
| 3,705,641 | 12/1972 | Brooks et al. | 188/73.3 |
| 3,782,510 | 1/1974 | Rath | 188/73.5 |
| 3,788,429 | 1/1974 | Brooks et al. | 188/73.5 |

FOREIGN PATENTS OR APPLICATIONS

| | | | |
|---|---|---|---|
| 728,709 | 4/1955 | United Kingdom | 188/73.3 |
| 1,154,701 | 6/1969 | United Kingdom | 188/73.6 |

Primary Examiner—Trygve M. Blix
Assistant Examiner—Edward R. Kazenske
Attorney, Agent, or Firm—John T. O'Halloran; Menotti J. Lombardi, Jr.; Alfred C. Hill

[57] ABSTRACT

A brake shoe support for a spot-type disc brake having a caliper embracing the brake disc. The caliper supports the brake shoe remote from the brake actuation device. The brake shoe includes a projection which is disposed in a supporting bore in the caliper and is held in position by a bolt having a radial groove which is engaged by a retaining spring secured to the caliper. The brake shoe also includes a brake pad carrier plate and a brake pad with the brake pad having a first portion parallel to the brake disc and a second portion perpendicular to the brake disc extending over the edge of the brake pad carrier plate. The second portion abuts a supporting surface provided in the caliper adjacent the end of the supporting bore adjacent the brake pad carrier plate to prevent twisting of the brake shoe.

5 Claims, 4 Drawing Figures

BRAKE SHOE SUPPORT FOR A SPOT-TYPE DISC BRAKE

CROSS-REFERENCE TO RELATED APPLICATION

This application is a continuation-in-part application of copending application Ser. No. 449,297, filed Mar. 8, 1974 now abandoned.

BACKGROUND OF THE INVENTION

This invention relates to a spot-type disc brake including an actuation device in a one-part housing which is provided with a caliper embracing the brake disc. During the actuation process a brake shoe connected to the actuation device is pressed against a brake disc, and by the force of reaction, acting upon the housing, a brake shoe remote from the actuation device, connected to and supported by caliper, is pressed against the brake disc.

From the British Pat. No. 1,154,701 a spot-type disc brake is known which has an actuation device in a housing which is provided with a caliper embracing the brake disc. The support and holding of the brake shoe remote from the actuation device is provided in the clamp by means of a supporting bolt. It is a disadvantage of this embodiment that the high pressure forces occurring during the braking process must be transmitted from the brake shoe to the caliper by means of the supporting bolt alone. This results in subjecting the supporting bolt to very heavy loads and the functioning capability of the brake is not quaranteed since the supporting bolt may break.

Moreover, such a support of the brake shoe remote from the actuation device considerably hampers the cylinder bore for receiving the actuation piston, since the inserting of operating tools is hindered by the caliper arm receiving the supporting bolt.

SUMMARY OF THE INVENTION

It is the object of this invention to provide a spot-type disc brake having a simple and highly loadable support for the brake shoe remote from the actuating device.

A feature of the present invention is the provision of an arrangement to support a brake shoe of a spot-type disc brake comprising: a housing having a longitudinal axis; an actuation device disposed in said housing coaxial of said axis; a caliper connected to the housing and embracing a brake disc; a first brake shoe connected to the actuation device and perpendicular to the axis; a second brake shoe perpendicular to the axis and associated with the caliper remote from said actuation device, the second brake shoe including a brake pad carrier plate and a brake pad, the brake pad having a first portion perpendicular to the axis and a second portion parallel to the axis extending over the outer edge of the carrier plate; a supporting bore disposed coaxial of an extension of the axis in the caliper remote from the actuation device; at least a first projection extending from and integral with the carrier plate in engagement with the supporting bore; and a supporting surface provided in the caliper remote from the actuation device at the end of the supporting bore adjacent the carrier plate, the supporting surface abutting the second portion of the brake pad to prevent twisting of the second brake shoe.

The projection of the brake shoe consisting of pad and pad carrier plate is provided as an integral part of the pad carrier plate. In order to secure the brake shoe against twisting it is favorable to arrange additional supporting surfaces at the bridge member of the caliper upon which the brake pad of the brake shoe lies in abutment. According to another embodiment the brake shoe may be provided with a second projection which is radially spaced from the first projection and which grips the supporting bore.

In order to render it possible that equal brake shoes can be used on both sides of the brake disc, the actuation device has according to this invention a recess in the front surface facing the brake shoe, into which recess the projection of the brake shoe projects with such clearance that it is freely movable between its supporting surfaces.

According to another feature of this invention the manufacture of pad carrier plates for brake shoes, of the same overall dimensions with or without projection is rendered possible in a simple way in that for punching a punching tool is used, the punches of which for pushing out the projections can be drawn out for the manufacture of pad carriers with even rear sides.

The advantages achieved by this invention expecially are characterized in that by simple means a highly loadable, secure and simply manufactured support of the brake shoe remote from the actuation device is achieved. Providing the supporting bore in an economic way is achieved in that this is possible in one operation when forming the cylinder bore for receiving the actuation device. The equal form of the two pad carrier plates also considerably cheapens this process by economic manufacture and low efforts when storing this part.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
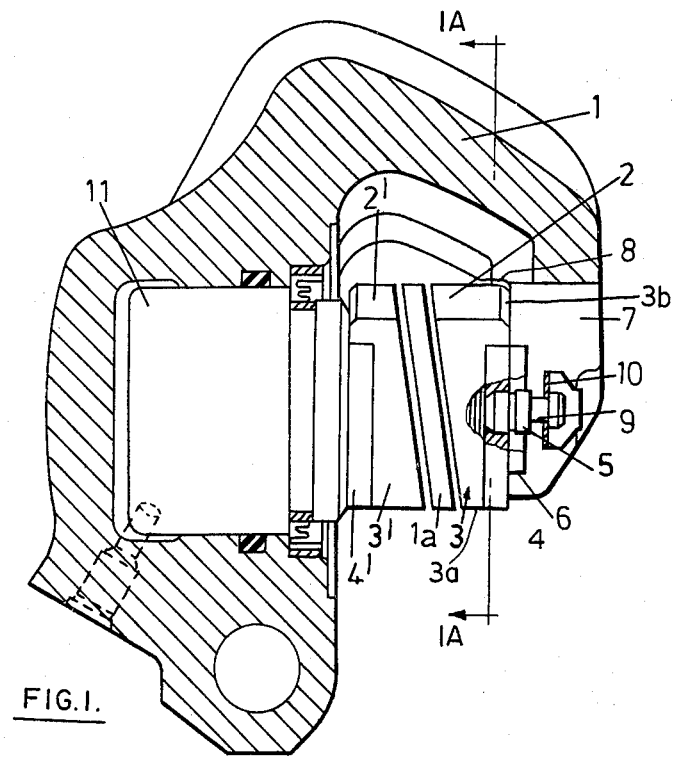
FIG. 1 is a cross sectional view partially in elevation of a spot-type disc brake in accordance with the principles of this invention.
Figure 1A:
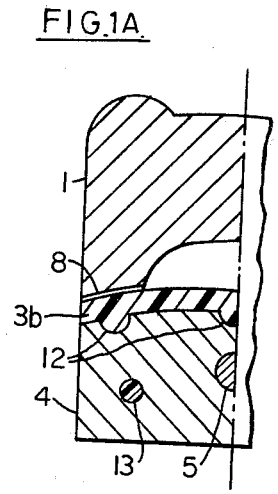
FIG. 1A is a partial cross sectional view taken along line 1A—1A of FIG. 1.
Figure 2:
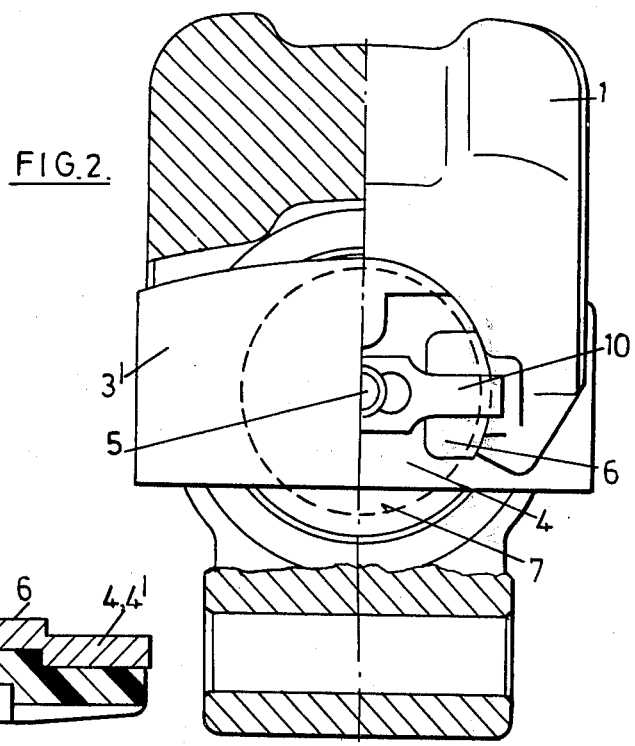
FIG. 2 is a cross sectional view partially in elevation of the spot-type disc brake of FIG. 1 as seen from the caliper.

Referring to FIGS. 1, 1A, 2 and 3, the caliper 1 embracing brake disc 1a of a spot-type disc brake supports a brake shoe 2 which is remote from actuation device 11. Brake shoe 2 includes the brake pad carrier plate 4 and the brake pad 3. Brake pad 3 includes a first portion 3a perpendicular to the longitudinal axis of the housing bore containing actuation device 11 and a second portion 3b parallel to the longitudinal axis and extending over the outer edge of carrier plate 4. A supporting bolt 5 is secured to carrier plate 4 coaxial of the longitudinal axis. Brake shoe 2 is fastened to caliper 1 by providing a radial groove 9 in bolt 5 with groove 9 being latched in a latching bore of retaining spring 10 which is secure to caliper 1. Carrier plate 4 includes projection 6 which extends into and engages the inner surface of a supporting bore 7 of caliper 1. Second portion 3b of brake pad 3 abuts a supporting surface 8 in caliper 1 at the end of bore 7 adjacent carrier plate 4 and, thus, prevents brake shoe 2 from twisting during a braking operation.

Recesses 12 are provided in the outer edge of carrier plate 4 and at least one recess 13 is provided in the surface of carrier plate 4 parallel to disc 1a. Recesses 12 and 13 engagedly receive the material of second portion 3b and first portion 3a of brake pad 3 to provide a better connection between brake pad 3 and carrier plate 4.

Brake shoe 2' is disposed adjacent actuation device 11 and includes brake pad 3' and brake pad carrier plate 4' which is identical to pad carrier plate 4 but has no projection 6.

Figure 3:
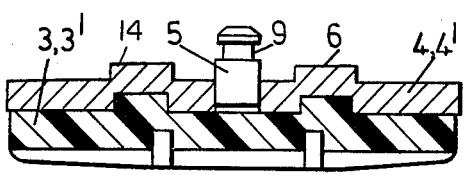
FIG. 3 is a cross sectional view of a brake shoe in accordance with the principles of this invention.

As shown in FIG. 3 a second projection 14 extends from and is integral with carrier plate 4, spaced from projection 6, to engage bore 7.

While I have described above the principles of my invention in connection with specific apparatus it is to be clearly understood that this description is made only by way of example and not as a limitation to the scope of my invention as set forth in the objects thereof and in the accompanying claims.

I claim:

1. An arrangement to support a brake shoe of a spot-type disc brake comprising:
   a housing having a longitudinal axis;
   an actuation device disposed in said housing coaxial of said axis;
   a caliper connected to said housing and embracing a brake disc;
   a first brake shoe connected to said actuation device and perpendicular to said axis;
   a second brake shoe perpendicular to said axis and associated with said caliper remote from said actuation device, said second brake shoe including a brake pad carrier plate and a brake pad, said brake pad having a first portion perpendicular to said axis and a second portion parallel to said axis extending over the outer edge of said carrier plate;
   a supporting bore disposed coaxial of said axis in said caliper remote from said actuation device;
   at least a first projection extending from and integral with said carrier plate in engagement with said supporting bore;
   a supporting surface provided in said caliper remote from said actuation device at the end of said supporting bore adjacent said carrier plate, said supporting surface abutting said second portion of said brake pad to prevent twisting of said second brake shoe; a supporting bolt secured to said carrier plate coaxial of said axis and extending into said supporting bore; and
   a retaining spring secured to said caliper extending into said supporting bore and fastened to said supporting bolt.

2. An arrangement according to claim 1, further including
   a second projection extending from and integral with said carrier plate spaced from said first projection and in engagement with said supporting bore.

3. An arrangement according to claim 1, wherein said supporting bolt includes
   a radial groove adjacent the end thereof extending into said supporting bore; and
   said retaining spring includes
   a latching bore in the end thereof adjacent said supporting bolt, said latching bore engaging said radial groove.

4. An arrangement according to claim 3 further including
   a second projection extending from and integral with said carrier plate spaced from said first projection and in engagement with said supporting bore.

5. An arrangement according to claim 1, further including
   at least a first recess in the edges of said carrier plate to receive material of said second portion of said brake pad; and
   at least a second recess in said carrier plate to receive material of said first portion of said brake pad;
   said first and second recesses assisting in connecting said brake pad to said carrier plate.

* * * * *